United States Patent Office 3,161,689
Patented Dec. 15, 1964

3,161,689
PROCESS FOR MAKING GRIGNARD REAGENTS
Glenn D. Cooper, Las Cruces, N. Mex., and Herman L. Finkbeiner, Ballston Lake, N.Y., assignors to General Electric Company, a corporation of New York
No Drawing. Filed Jan. 23, 1963, Ser. No. 253,249
15 Claims. (Cl. 260—665)

This application is a continuation-in-part of our application Serial No. 125,094, filed July 19, 1961, now abandoned, and assigned to the same assignee as the present invention.

This invention is concerned with a process for making Grignard reagents useful in the preparation of other chemical compounds. More particularly, the invention relates to a process which comprises reacting in a Grignard solvent medium an olefinic compound (hereinafter so designated) having the formula R—CH=CH$_2$ with an alkyl Grignard reagent (also hereinafter so designated) having the formula R'MgX in the presence of a titanium or zirconium catalyst selected from the class consisting of halides of titanium, halides of zirconium, alkoxides and aryloxides of titanium (also known as alkyl and aryl titanates), and alkoxides and aryloxides of zirconium (also known as aryl and alkyl zirconates), where R is a monovalent organic radical free of substituents reactive with the alkyl Grignard reagent, R' is an alkyl radical of at least 2 carbon atoms (e.g., from 2 to 6, or more carbon atoms) having a hydrogen atom on the beta carbon atom, and X is a halogen (e.g., chlorine, bromine, iodine, etc.), thereby introducing the entire olefinic compound as a new radical of the formula R'CHCH$_2$ into the Grignard reagent derived from the olefinic compound, where R has the above meaning.

This introduction of the olefin compound as a

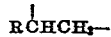

group can be (1) as a substitution in place of the R' radical in the Grignard reagent to yield a new Grignard reagent of the formula RC$_2$H$_4$MgX (with the release of the R' of the initial Grignard reagent R'MgX as an olefin), or (2) can be an addition to the initial Grignard reagent to form a new Grignard reagent of the formula R'RCH—CH$_2$MgX In the case of the addition reaction (2), isomerization of R' occurs if secondary or tertiary radicals can at all be formed. Thus, when n-butene is added to n-propyl MgBr in the presence of the catalyst, the addition product is composed essentially of

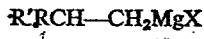

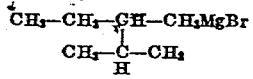

Grignard reagents are commonly prepared by reacting an organic halide, for instance, ethyl bromide, propyl bromide, phenyl bromide, etc., with magnesium, usually in a solvent medium such as diethyl ether, tetrahydrofuran, etc. The Grignard reagents thus obtained are among the most generally useful reagents in organic chemistry. They react with a wide variety of compounds, such as aldehydes, ketones, carbon dioxide, esters, orthoformates, cyanogen halides, oxiranes, chlorosilanes, etc., to form alcohols, acetals, nitriles, etc., within the framework of the usual Grignard reactions such as may be found in the book "Grignard Reactions of Nonmetallic Substances," by Kharasch and Reinmuth, published by Prentice-Hall (1954). The Grignard reagents prepared by the method of this invention undergo all of the reactions of Grignard reagents prepared in the conventional manner, and thus provide a means for preparing compounds (alcohols, acids, aldehydes, etc.) containing the

group, where R has the meaning given above, and the unsatisfied valences are satisfied by (1) magnesium and (2) carbon or hydrogen.

A limitation on the use of Grignard reagents in the the past has been that the necessary organic halides used to make these reagents have not always been readily available. In addition, it is sometimes difficult to prepare the Grignard reagent directly by reaction of the organic halide with magnesium, even when the halide is available. It would, therefore, be highly desirable to be able to employ readily available and inexpensive alkyl halides such as ethyl bromide or propyl bromide, which readily form Grignard reagents and be able to react these Grignard reagents with readily available and inexpensive olefins to produce new Grignard reagents which cannot easily be obtained by presently known methods.

It is therefore one of the objects of this invention to readily prepare Grignard reagents which heretofore have been prepared with difficulty.

It is another object of the invention to prepare Grignard reagents from readily available starting materials.

It is a still further object of the invention to prepare Grignard reagents in which the organic part of the Grignard reagent is derived from readily available compositions which cannot be found available as a halide as readily or as inexpensively.

Other objects of the invention will become more apparent from the discussion which follows.

In accordance with our invention, we have discovered a highly flexible process for making Grignard reagents from readily available starting materials to prepare in good yields and with a minimum of control problems, Grignard reagents of the formula RC$_2$H$_4$—MgX and of the formula R'RC$_2$H$_3$MgX by reacting in a Grignard reagent solvent a composition having the formula

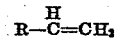

with a Grignard reagent having the formula R'MgX in the presence of a certain class of titanium and zirconium compounds as catalysts more specifically recited above, where R, R', and X have the meanings given above.

Our process permits the use of recently made available, inexpensive long-chain or branch-chained olefins as starting materials to make these Grignard reagents. Furthermore, these olefins are readily available in contrast to the unavailability and the difficulty often encountered in preparing the halides of organic compounds of equivalent chain length required for reaction with the magnesium (or lithium) to make the usual Grignard reagents. Furthermore, by means of our process we are able to make highly desirable Grignard reagents from readily available and expensive alkyl halides and olefins.

Depending on the concentration of the titanium or zirconium catalyst (or both catalysts), as pointed out above, the introduction of the olefinic compound as a

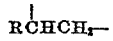

group into the Grignard reagent will be either by replacement of the R' radical or by addition of the R' radical of the alkyl Grignard reagent to the radical derived from the olefinic compound. When the ratio of the weight of the titanium or zirconium metal content of the catalyst to the weight of the magnesium in the Grignard reagent is below about 0.25, it is found that the reaction is disposed more strongly to replacement (or exchange) of the R' alkyl radical with the

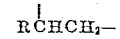

group, with the concomitant formation of smaller though detectable amounts of addition compounds. As the weight ratio (or concentration) of the titanium or zirconium to magnesium increases above about 0.25, the reaction is directed more predominantly toward the addition type Grignard reagent. The actual weight ratio of the titanium or zirconium to magnesium will vary depending on the Grignard reagent used (i.e., the R' group in the Grignard) and on the titanium or zirconium catalyst used.

Stated alternatively, where the concentration of the titanium and zirconium catalyst is low, the reaction predominantly goes in the direction of producing a new Grignard reagent derived from the olefinic compound displacing the R' group of the alkyl Grignard reagent and displaying reactions of a compound having the formula $RC_2H_4MgX$ where R and X have the meanings given above. R in the group

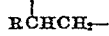

may be either on carbon adjacent to the magnesium or on a carbon once removed from the magnesium, for example, as shown by the formulas

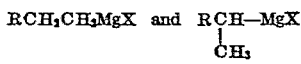

Where the titanium or zirconium catalyst is in a higher concentration range, there is increased tendency toward the formation of addition products of the formula $R'RCH-CH_2MgX$, where R, R' and X have the meanings assigned above. A more specific example of such reaction is illustrated by the following equation:

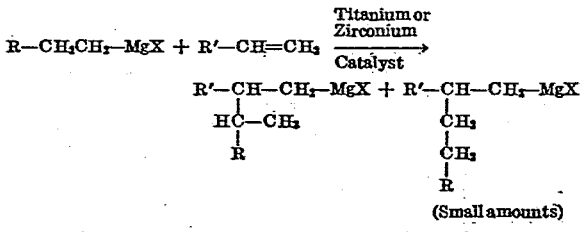

(Small amounts)

where R and R' and X have the meanings given above.

As noted in the above equation, the addition of the Grignard reagent to the olefin is, with one known exception (e.g., when using styrene as the olefin), through the medium of the beta carbon of the olefinic compound.

In the specification and claims, the following definitions will be used:

"Grignard solvent medium" is intended to mean those liquid media which are employed for making Grignard reagents. Included among these Grignard solvent media may be mentioned the dialkyl ethers (e.g., dimethyl ether, diethyl ether, dipropyl ether, methyl ethyl ether, diisopropyl ether, ethyl butyl ether, etc.); cyclic oxygen-containing aliphatic compounds (e.g., tetrahydrofuran, dioxane, etc.); alkyl aryl ethers (e.g., anisole, phenetole, etc.); dialkyl ethers of an ethylene glycol (e.g., the dimethyl ether of ethylene glycol, the dibutyl ether of ethylene glycol, the diethyl ether of diethylene glycol, etc.), pyridine, etc.

"Halides of titanium" and "halides of zirconium" are intended to mean not only inorganic halides of these two metals (including oxyhalides, such as oxychlorides) but also halides of these two metals in which organic radicals are attached directly to the titanium or zirconium atoms. "Alkoxides" and "aryloxides" of titanium and zirconium are intended to include not only where such organoxides are the sole group attached indirectly to the zirconium and titanium atoms, but also includes such organoxides attached to titanium and zirconium which also contain organic groups attached directly to titanium and zirconium; the terms are also intended to include polymeric as well as monomeric titanates and zirconates.

The term "monovalent organic radical" which is to be free of substituents reactive with compounds of the formula R'MgX, is intended to mean those organic radicals which do not have any substituent which will react readily with the aforesaid Grignard reagent and preferably these substituents are substantially inert under any condition of reaction. Thus, one should avoid any organic radicals representing R which contain such substituents as the carboxy group, ketone group, nitro group, primary and secondary amino groups, etc.

Among the radicals which R may be, are, for instance, alkyl, including cycloalkyl (e.g., methyl, ethyl, propyl, isopropyl, butyl, hexyl, decyl, dodecyl, cyclopentyl, cyclohexyl, etc.); aryl radicals (e.g., phenyl, naphthyl, biphenyl, etc.); alkaryl radicals (e.g., tolyl, xylyl, ethyl phenyl, etc.); arylalkyl radicals (e.g., benzyl, phenyl ethyl, etc.); alkenyl radicals (e.g., vinyl, allyl, crotyl, cyclohexenyl, cyclopentenyl, etc.). In addition to R being the groups recited above, R can also be the same groups which are further substituted by other substituents, where one or more of the hydrogen atoms on the aforesaid groups are substituted by atoms or groups which may be aliphatic (e.g., methyl, ethyl, vinyl, propyl, propenyl, butyl, amyl, hexyl, octyl, etc., and isomers and homologues thereof); alkoxy (e.g., methoxy, ethoxy, vinyloxy, propoxy, propenoxy, butoxy, etc. and isomers and homologues thereof); halogen and halogen-substituted radicals (e.g., chlorine, fluorine, bromine, bromotolyl, chlorobromonaphthyl, betachloroethyl, parachlorophenyl, tetrachlorophenyl, bromotolyl, methoxyphenyl, phenoxyphenyl, etc., and isomers and homologues thereof); aryloxy (e.g., phenoxy, tolyloxy, xylyloxy, chlorophenoxy, chloronaphthoxy, etc., and isomers and homologues thereof), and the like. R may also be an organosilyl radical, e.g., trimethylsilyl, triphenylsilyl, trimethylsiloxy, etc., radicals; the pyridyl radical; organomercapto compounds, e.g., methylmercapto ($CH_3S-$), phenylmercapto $$(C_6H_5S-)$$

etc., radicals.

Specific examples which compounds of formula

may be, are, for instance, propylene, 1-butene, 3-methylbutene-1, isoprene, 1-pentene, 1-hexene, 1-dodecene, 3-methyl-1-pentene, vinylcyclohexane, 4-vinylcyclohexene, allyl methyl sulfide, allyl benzene, styrene, butadiene, m-chlorostyrene, p-methylstyrene, 4-chloro-1-hexene, 2-methyl-1,5-hexadiene, allyl phenyl ether, 5,5,5-trifluoro-1-pentene, 3-vinylthiophene, 4-vinylpyridine, vinyl thioethyl ether, allyltrimethylsilane, vinyltriphenylsilane, vinylheptamethylcyclotetrasiloxane, etc.; p-bromostyrene, p-methoxy styrene (including its isomers and homologues), phenoxy styrene (including its isomers and homologues).

R' in the above formula is an alkyl radical of at least two carbon atoms, preferably from 2 to 6 carbon atoms, for instance, ethyl, propyl, isopropyl, butyl, amyl, hexyl, 2-ethyl hexyl, etc. Among the Grignard reagents which may be used of the formula R'MgX are, for instance, ethyl magnesium bromide, n-propyl magnesium bromide, n-propyl magnesium chloride, isopropyl magnesium chloride, 1-butyl magnesium bromide, 3-amylmagnesium bromide, etc.

Among the halides of titanium, halides of zirconium, alkoxides of titanium, aryloxides of titanium, alkoxides of zirconium, and aryloxides of zirconium which may be employed as the catalytic agents in the above reaction may be mentioned, for instance, titanium tetrachloride, titanium tetrabromide, titanium tetraiodide, zirconium tetrachloride, zirconium tetrafluoride, zirconium tetraiodide, zirconium oxychloride, zirconium oxybromide, ethyl titanium trichloride, monomeric titanates and monomeric zirconates of the formula $R_mTi(OR)_{4-m}$ and $R_mZr(OR)_{4-m}$ where R has the meaning given above (and may stand for the same or different radicals) and $m$ is a whole number equal to from 0 to 3, inclusive. Examples of such titanates and zirconates are, for example, tetraethyltitanate, tetraethylzirconate, tetrabutyltitanate, tetrapropylzirconate, phenyl triisopropyl titanate, tetraphenyl titanate, tetraphenylzirconate, methyl triethoxy titanium, titanium mentholate, diphenyl diisopropoxy titanium, phenyl triisopropoxy titanium, diphenyl diethoxy titanium having the formula $(C_6H_5)_2Ti(OC_2H_5)_2$, tributylethylzirconate, phenyltriethylzirconate, dicyclopentadienyl titanium dichloride, etc. Polymers of the titanates and of the zirconates where some or all of the valences are substituted by organoxy groups also may be used. Included among such compositions may be mentioned, for instance, polyethyltitanate having the formula

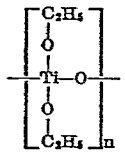

where $n$ is a whole number greater than 1, for instance, 5 to 1000 or more, polybutyltitanate, polyethylzirconate, etc. The presence of branched chains in the polymeric titanates and zirconates is not precluded nor is the presence precluded of organic radicals attached directly to titanium or to zirconium by carbon-titanium or carbon-zirconium linkages, respectively. As examples of the latter compositions may be mentioned polymers having the unit

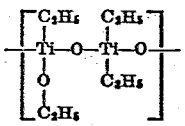

Many of the polytitinates and polyzirconates, especially those of the linear type, may be terminated by titanium- or zirconium-bonded hydroxyl groups.

The manner whereby our process is carried out is relatively simple. Having prepared the usual Grignard reagent (of the formula R'MgX) in the Grignard solvent, it is advantageous to add the olefinic compound and cool the reaction mixture to below room temperature (about 25° C.), for instance, from around —5° to about 15° C. Thereafter, a small amount of the titanium or zirconium catalyst (hereinafter referred to as "catalyst") is added and the mixture of ingredients allowed to come to room temperature or heated to as high as 200° C. consistent with optimizing the reaction results. Generally, we have found that heating the mixture of ingredients at the reflux temperature of the mass (with stirring) is adequate for carrying out the reaction. Higher temperatures can be used by employing higher boiling solvents, or else resorting to super-pressure conditions. The time of heating may be varied depending upon such factors as the olefin and alkyl Grignard used, the concentration of catalyst, etc. Generally, we have found that within 15 minutes to about 20 hours, the reaction has essentially gone to completion. Thereafter, the new Grignard reagent, still in solution in the Grignard solvent and obtained from the reaction of the olefinic compound with the alkyl Grignard reagent, can be treated with various agents designed to make the final products usually derived through the medium of the Grignard reaction.

As pointed out above, at lower concentrations of the titanium or zirconium catalyst, the reaction between the usual Grignard reagent and the olefinic compound constitutes predominantly an exchange reaction whereby the olefinic compound replaces the alkyl group of the Grignard reactant. Under such conditions, the attachment of the magnesium atom is ordinarily through the medium of the terminal carbon atom of the olefinic unsaturation. In some instances, this attachment may occur through the beta carbon atom of the olefinic group, especially, where one is using aromatic-substituted olefinic compounds. Illustrative of the mechanism whereby the new Grignard reagents are prepared by the replacement or exchange reaction from the olefinic compounds are the following equations which are based on the reaction of pentene-1 with a Grignard reagent specifically, ethyl magnesium bromide, employing titanium tetrachloride as the catalyst. The following equations show not only the means of attachment through the olefinic carbon atom, but also the products which are obtainable as a result of further treating the new Grignard reagent with reactants normally employed to form materials, such as alkanes, alcohols, esters, acids, etc.

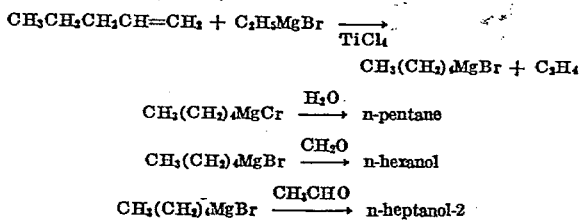

It will be apparent to those skilled in the art that instead of employing the conditions recited above, the reaction condition may be altered whereby the usual Grignard reagent dissolved in the Grignard solvent is mixed with the catalyst; thereafter the olefin is added, after which the reaction mixture is heated at a temperature which is suitable for converting the usual Grignard reagent to the desired Grignard derivative derived from the olefinic compound used in the reaction mixture. As pointed out above, and depending on whether it is desired to expedite the exchange reaction or the addition reaction, the amount of catalyst can be varied widely, without departing from the scope of the invention. Generally, we can employ from as low as positive trace amounts of the catalyst (mixtures of catalysts can also be used) to at least as high as equimolar concentrations of the catalyst and the Grignard reagent.

The new Grignard reagents prepared in accordance with our process can be reacted in well known manners associated with Grignard reactions with the various reactants designed to give the desired product. Thus, by reacting the Grignard reagent with aldehydes (e.g., formaldehyde, acetaldehyde, etc.), one obtains alcohols. When the Grignard reagent is reacted with carbon dioxide, one obtains acids. When one adds a ketone (e.g., acetone, methyl ethyl ketone, dibutyl ketone, etc.), one obtains an alcohol. The addition of organic orthoformates (e.g., ethyl orthoformate, propyl orthoformate, etc.) to the newly formed Grignard reagent yields acetals. The reactions between the newly formed Grignard reagent and the above other reactants to form the ultimately desired product are reactions which are well documented in the art, as, for instance, in the aforesaid book by Kharasch and Reinmuth, which by reference for brevity is made part of the disclosures of the present application.

In order that those skilled in the art may better understand how the present invention may be practiced, the following examples are given by way of illustration and not by way of limitation. All parts are by weight.

EXAMPLE 1

The n-propyl Grignard used in the succeeding examples was prepared as follows. A solution of about 135 parts of n-propyl bromide in about 71 parts diethyl ether was slowly added to 24.3 parts magnesium in 142 parts ether over a period of about 30 minutes in a reaction vessel equipped with a stirrer, dropping funnels and a reflux condenser connected to a Dry-Ice trap protected by a nitrogen by-pass. The mixture was then cooled in ice. This Grignard reagent, which had the formula

in the ether solvent, was used in many of the following examples in the reaction with the various olefins employing the titanium or zirconium catalyst. The same technique was used to make the other Grignard reagents recited below.

EXAMPLE 2

A Grignard reagent, prepared from 0.1 mole of n-propyl bromide and 0.1 mole magnesium in 40 ml. of diethyl ether, was combined with 13.4 grams (0.1 mole) of p-methoxy-styrene and the solution cooled to 0° C. Thereafter 0.4 ml. of titanium tetrachloride was added and the mixture was heated at the reflux temperature of the mass for 2 hours, cooled to 0° C. again and a second portion of 0.1 ml. of titanium tetrachloride added. After this addition, the mixture was again heated at reflux for 16 hours, and then cooled to −13° C. to give a Grignard reagent having the formula

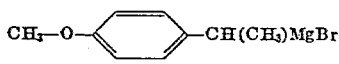

Dry carbon dioxide was then added at a rate sufficient to maintain the temperature at about −5° C. After one hour, the temperature dropped to −13° C., and did not rise when the flow rate was increased. The magnesium salt was decomposed by the addition of ice and 20% $H_2SO_4$. The ether layer was separated and the aqueous phase was again extracted with ether. The combined ether extracts were extracted with 25% aqueous NaOH solution and the aqueous phase separated and acidified with concentrated HCl. A liquid separated which was removed, and the aqueous phase was extracted with benzene and the benzene solution was added to the previously separated organic liquid. After drying, the mixture was distilled at atmospheric pressure to remove benzene and other volatiles. After stripping under vacuum, there remained 8.6 grams of a brown oil having a neutral equivalent of 194 and comprising p-methoxyhydratropic acid. The oil was refluxed with 500 ml. water and treated with decolorizing carbon. On cooling the filtrate, colorless crystals melting between 54–56° C. were obtained. The residue was extracted with 500 ml. of boiling water yielding a second crop of crystals of the acid melting between 54–56° C. Recrystallization of both mixtures of crystals from a benzene-petroleum ether mixture yielded pure p-methoxyhydratropic acid having a melting point of 55.5–56° C. The melting point of a mixture of this material with a sample of p-methoxyhydratropic acid prepared by another method was underpressed.

EXAMPLE 3

To a Grignard reagent prepared from 0.5 mole of n-propyl bromide and 0.5 mole magnesium in 200 ml. of ether was added 55 grams (0.5 mole) of vinylcyclohexane. The solution was cooled to 0° C., 1.05 ml. of titanium tetrachloride was added and the mixture was heated at reflux for two hours. The mixture was then cooled to 0° C., 0.45 ml. of titanium tetrachloride was added and again the mixture refluxed for 16 hours to yield the Grignard of the vinylcyclohexane. After diluting the reaction mixture with 200 ml. of ethyl ether, the mixture was cooled to −13° C. to give a Grignard reagent having the formula $C_6H_{11}CH_2CH_2MgBr$. Dry carbon dioxide was added similarly as in Example 2. The magnesium salt was decomposed by the addition of ice and 20% sulfuric acid. The ether layer was separated and the aqueous phase was extracted with ether. The combined ether extracts were extracted with 25% aqueous sodium hydroxide solution and the aqueous phase was separated and acidified with concentrated hydrochloric acid. The yellow oil which separated was drawn off. The aqueous phase was extracted with 15 ml. of benzene and the benzene solution was added to the yellow oil and dried over anhydrous magnesium sulfate. Distillation yielded 38.2 grams of β-cyclohexylpropinic acid boiling between 114–115° C./1.5 mm., $n_D^{20}$ 1.4647. The acid had a neutral equivalent of 158, compared with the theoretical value of 156.

EXAMPLE 4

To 0.5 mole n-propylmagnesium bromide in 500 ml. diethyl ether was added at 0° C., 56 grams 1-octene (0.5 mole) and 1.5 ml. titanium tetrachloride. The mixture was heated for 24 hours at the reflux temperature of the mass to give the Grignard reagent derived from 1-octene having the formula $C_8H_{17}MgBr$. A 25 ml. sample was hydrolyzed with 15 grams of ice and 5 ml. of hydrochloric acid to give a 58.2% yield of octane.

EXAMPLE 5

A solution of 0.175 mole n-propylmagnesium bromide, 0.25 ml. titanium tetrachloride and 9.8 grams 1-octene was refluxed for 30 hours to form the same Grignard derived from 1-octene as in Example 4. The mixture of ingredients was cooled to 0° C. and 0.25 mole triethylorthoformate was added. The mixture was then heated at the reflux temperature of the mass for 60 hours, the diethyl ether was decanted and the remaining solid material was washed twice with 50 ml. of ethyl ether. Distillation of the ether solution yielded 7.3 grams of pelargonic diethyl acetal having a boiling point of 64–66° C. at 25 mm. and having $n_D^{20}$ 1.4219.

EXAMPLE 6

In this example, to a Grignard reagent prepared from 0.5 mole n-propyl bromide and 0.55 mole magnesium in 200 ml. of diethyl ether, was added 42 grams (0.5 mole) 1-hexene. The solution was cooled to 0° C., 1.05 ml. of titanium tetrachloride was added, and the mixture was heated under reflux for two hours. The mixture was again cooled at 0° C., 0.45 ml. titanium tetrachloride was added, and refluxing was continued for 16 hours. At the end of this time the newly formed Grignard reaction product from the 1-hexene having the formula $C_6H_{13}MgBr$ was mixed with 73.5 grams (0.75 mole) cyclohexanone added at about 0° C. After the mixture was stirred for one hour at room temperature, the magnesium salt was decomposed by the addition of ammonium chloride and the ether layer was distilled, yielding 21.45 grams of 1-hexylcyclohexanol having a boiling point of 114–116° C./4 mm., $n_D^{20}$ 1.4665.

EXAMPLE 7

To 0.5 mole of n-propylmagnesium bromide in 400 ml. of ether was added 56 grams (0.5 mole) 1-octene and 1.5 ml. titanium tetrachloride at a temperature of about 0° C. This mixture was stirred and heated at reflux temperature for 18 hours to give the Grignard derived from the 1-octene having the formula $C_8H_{17}MgBr$. The reaction mixture was cooled and a stream of dry carbon dioxide was passed over the surface of the mixture at such a rate that the temperature stayed below −5° C. When the reaction was complete to form pelargonic acid, the temperature of the system was lowered to −20° C. and 300 ml. of methanol for esterification purposes was added at such a rate as to keep the temperature between −20° and −30° C. After the methanol had been added, dry hydrogen chloride was led into the reaction vessel, the reaction mixture stirred for 2½ hours, poured into 600 grams ice, the ether phase separated and the aqueous layer extracted with ether. After drying the organic material was distilled to give 34.3 grams methyl pelargonate boiling at 97–99° C./12 mm., $n_D^{20}$ 1.4205.

EXAMPLE 8

To 1.0 mole of n-propylmagnesium bromide in 800 ml. of diethyl ether cooled to 0° C. was added 108 grams (1 mole) of 4-vinylcyclohexene and 3.2 ml. of titanium tetrachloride. The mixture was heated at the reflux temperature of the mass for 18 hours to form the Grignard from the cyclohexene, and thereafter cooled to −10° C. to give a Grignard reagent having the formula

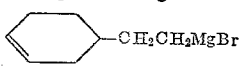

Dry carbon dioxide was admitted over the surface of the reaction mixture at such a rate that the temperature stayed below −5° C. When increasing the flow of carbon dioxide no longer raised the temperature, the carbon dioxide addition was stopped. At this point 1.0 liter of 25% (by volume) aqueous sulfuric acid was added. After stirring for 30 minutes, the ether phase was separated and the aqueous layer extracted twice with 75 ml. portions of ether. The ether layers were combined and extracted three times with a total of 350 ml. of 25% sodium hydroxide. At each extraction, enough water was added to dissolve the soap that formed. The aqueous basic extract was heated to boiling and enough distillate was removed to reduce the volume by 10%. The liquid was then cooled and concentrated hydrochloric acid added until the aqueous phase was acid to Congo red. The organic layer was then separated and the water layer extracted with 50 ml. portions of chloroform. All the organic material was combined and dried over anhydrous magnesium sulfate. After removing the chloroform by distillation, the residue was fractionated to give a total of 44 grams of β-(Δ³-cyclohexenyl) propionic acid having the formula

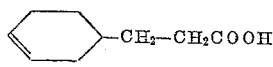

boiling point 99–102° C./0.2 mm.; melting point 31–2° C. $n_D^{38}$ 1.4732. Analysis of this compound showed that it contained 69.8% carbon and 9.3% hydrogen as contrasted to the theoretical values of 70.1% carbon and 9.2% hydrogen.

EXAMPLE 9

A Grignard reagent was prepared from 0.5 mole n-propyl bromide and 0.55 mole magnesium in 200 ml. diethyl ether; 45 grams 1-pentene (or n-pentene) was added and the solution was cooled to 0° C. After addition of 3.9 grams of titanium isopropoxide [$(C_3H_7O)_4Ti$] the mixture was heated at the reflux temperature of the mass for 16 hours to form the Grignard from the 1-pentene. Thereafter, 200 ml. of ethyl ether was added and the mixture was treated with 20 grams formaldehyde and the product isolated by decomposing the mixture by the addition of ice and 20% aqueous sulfuric acid. After steam distillation, the organic layer was separated and distilled yielding 11.8 grams of 1-hexanol having a boiling point of 87° C./49 mm., $n_D^{20}$ 1.4182.

The following example shows the effect of omitting the catalyst from the reaction described in Example 9 of the olefinic compound with the Grignard reagent.

EXAMPLE 10

A Grignard reagent prepared from 0.5 mole of n-propyl bromide and 0.55 mole of magnesium in 200 ml. of ether was heated under reflux for 18 hours with 45 grams of 1-pentene. Formaldehyde was added to the mixture and the mixture was decomposed with ice and sulfuric acid and distilled with steam similarly as was done in Example 9. The organic phase of the distillate was separated, dried, and distilled yielding n-butyl alcohol. No n-hexanol could be detected on analysis of the crude product and of the distillation residue.

EXAMPLE 11

A Grignard reagent was prepared from 0.5 mole n-propyl bromide and 0.55 mole magnesium in 400 ml. of diethyl ether. About 45 grams 1-pentene was added to the Grignard reagent and the solution was cooled to 0° C. After addition of 3.34 grams of dicyclopentadienyl-titanium dichloride, the mixture was heated at the reflux temperature of the mass for 12 hours to give a new Grignard derived from the 1-pentene having the formula $C_5H_{11}MgBr$, and then reacted with formaldehyde and the reaction product isolated as in Example 9. Fractional distillation yielded 10.2 grams 1-hexanol having a boiling point 90° C./50 mm., $n_D^{20}$ 1.4182.

EXAMPLE 12

A Grignard reagent was prepared from 0.5 mole n-propyl bromide and 0.55 mole magnesium in 200 ml. of diethyl ether. 45 grams of 1-pentene was added, and the solution was cooled to 0° C. At this point 3.3 grams of zirconium tetrachloride was added and the mixture was heated at the reflux temperature of the mass for 16 hours to give the Grignard derivative of 1-pentene having the formula $C_5H_{11}MgBr$. Thereafter 200 ml. of diethyl ether was added to the mixture, the latter cooled to 0° C. and about 20 grams formaldehyde was introduced in a slow stream of nitrogen. The mixture was decomposed by the addition of ice and 20% aqueous sulfuric acid. After steam distillation, the organic layer was separated and distilled, yielding 14.4 grams of 1-hexanol having a boiling point 85° C./45 mm., $n_D^{20}$ 1.4186.

EXAMPLE 13

To a Grignard reagent prepared from 0.1 mole magnesium and 0.1 mole isopropyl bromide in 50 ml. of diethyl ether was added at 0° C. $2.2 \times 10^{-3}$ moles of titanium tetrachloride and 0.1 mole of 1-pentene. The reaction mixture was heated at the reflux temperature of the mass for 18 hours to form a new Grignard reagent derived from 1-pentene having the formula

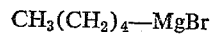

The reaction mixture was then hydrolyzed with 5 grams of ammonium chloride in 15 ml. of water. After the solid residue from the reaction had been washed with 25 ml. of diethyl ether, the product was dried over magnesium sulphate. Analysis of this material showed that a good yield of n-pentane had been obtained. When the reaction described above was carried out with the exception that n-propyl bromide was used to make the initial Grignard reagent in place of the isopropyl bromide, similar results were obtained with the exception that a somewhat larger yield of n-pentane was realized.

EXAMPLE 14

To a Grignard reagent prepared from 0.5 mole of n-propyl bromide and 0.55 mole magnesium in 200 ml. of diethyl ether was added 42 grams (0.5 mole) of 4-methyl-1-pentene. The solution was cooled to 0° C., 1.05 ml. titanium tetrachloride was added, and the mixture was heated at the reflux temperature of the mass for 2 hours and cooled again to 0° C. A second portion of 0.35 ml. of titanium tetrachloride was added, the mixture was refluxed for 16 more hours to yield the new Grignard derived from the aforesaid pentene having the formula

The reaction mixture was then again cooled to 0° C. and a solution of 28 ml. acetaldehyde in 50 ml. diethyl ether was added over a period of 1 hour. Since the mixture still showed evidence that some Grignard reagent was present and unreacted, a solution of 5 ml. acetaldehyde in 25 ml. of diethyl ether was added and the mixture was again stirred at room temperature (about 22° C.) for ten minutes. Thereafter, the reaction mixture was decomposed by the addition of ammonium chloride solution. The ether layer was separated and distilled, yielding 24.2 grams of 6-methyl-2-heptanol, boiling point 82–85° C./22 mm., $n_D^{20}$ 1.4248.

EXAMPLE 15

A Grignard reagent was prepared from 0.5 mole of n-propyl bromide and 0.55 mole magnesium in 200 ml. of diethyl ether. To this Grignard reagent was added 59 grams (0.5 mole) of allyl benzene. The solution was cooled to 0° C. and 1 ml. of titanium tetrachloride was added. The mixture was heated at the reflux temperature of the mass for 16 hours to form the new Grignard reagent derived from the allyl benzene having the formula

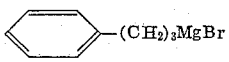

The reaction mixture was cooled, and treated with dry carbon dioxide as shown in previous examples. The mixture was decomposed with 25% aqueous sulfuric acid and extracted with diethyl ether. The ether solution was in turn extracted with 25% aqueous sodium hydroxide solution. After boiling for a short time to remove volatile organic compounds, the sodium hydroxide solution was cooled and acidified with 36% hydrochloric acid. The mixture was extracted with diethyl ether and the ether was evaporated at 50° C. On cooling, 50.9 grams of waxy plates of gamma-phenylbutyric acid were obtained. Recrystallization of the waxy plates from water yielded the pure acid having a melting point of 50.5–51° C. The neutral equivalent was 166, compared to the theoretical value of 164.

EXAMPLE 16

To 1.0 mole of n-propylmagnesium bromide in 800 ml. of ethyl ether was added 108 grams (1.0 mole) of 4-vinylcyclohexene and 3.0 ml. of titanium tetrachloride at 0° C. The reaction mixture was refluxed for 16 hours then cooled to 0° C. to give the Grignard reagent therefrom. A stream of dry air was passed over the surface of the stirred mixture for 1 hour. The air was then replaced by oxygen for an additional 1.5 hours. At the end of this time the reaction mixture was poured into 800 ml. of water containing 100 ml. of concentrated (37.1%) hydrochloric acid. The aqueous phase was extracted with a total of 600 ml. of ethyl ether. After drying over magnesium sulfate the product was distilled. A yield of 50 grams of $\beta$-($\Delta^3$-cyclohexenyl) ethanol (B.P. 92–94° C./4 mm., $n_D^{20}$ 1.4835) was obtained.

EXAMPLE 17

A solution of 0.5 mole of 3-amylmagnesium bromide in 400 ml. of ethyl ether was cooled to 0° C. and 56 grams of 1-octene was added, followed by 1.5 ml. of titanium tetrachloride. After refluxing for 16 hours, the mixture was cooled to 0° C., and 29 grams of acetone was added over a period of 20 minutes. The reaction was then stirred for 2 hours at room temperature. After hydrolysis with 30 ml. of water and 55 grams of ammonium chloride, the ether was decanted off and the residue washed with an additional 200 ml. of ether. Distillation yielded the alcohol, 2-methyldecanol-2 (B.P. 82–3° C./1 mm., $n_D^{20}$ 1.4380).

EXAMPLE 18

52 grams (0.5 mole) of styrene was added to a Grignard reagent prepared from 0.5 mole of n-propyl bromide and 0.55 mole of magnesium in 200 ml. of diethyl ether. The solution was cooled to 0° C., 1.05 ml. of titanium tetrachloride was added and the mixture was then stirred and heated at reflux temperature of the mixture for 2 hours. The mixture was then cooled, 0.45 ml. of titanium tetrachloride was added, and refluxing was continued for 16 hours to give a Grignard reagent having the formula

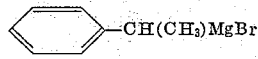

The mixture was then diluted with 200 ml. of diethyl ether, cooled to −13° C., and treated with carbon dioxide as in previous examples. The mixture was decomposed with sulfuric acid and the organic layer was separated. The aqueous phase was extracted with diethyl ether and the ether extract combined with the organic layer previously obtained. The ether solution was extracted with 25% aqueous sodium hydroxide solution. The sodium hydroxide solution was heated to remove volatile organic compounds and then cooled and acidified with concentrated hydrochloric acid. The mixture was extracted with diethyl ether and the ether extract was distilled yielding 37.6 grams of hydratropic acid boiling at 125° C. at 3 mm. pressure and having a refractive index $n_D^{20}$ 1.5230.

EXAMPLE 19

A Grignard reagent was prepared from 0.5 mole n-propyl bromide and 0.55 mole magnesium in 200 ml. diethyl ether in the same fashion as was done in the preceding examples. The solution was cooled to 0° C. and 52 grams (0.5 mole) of styrene and 1.45 ml. titanium tetrachloride was added. The mixture was heated to the reflux temperature of the mass for 18 hours to give a composition having the formula

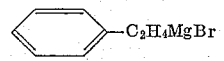

and trace amounts of a compound having the formula

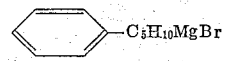

The mixture was cooled to −5° C. and thereafter oxidized by passing dry air through the mixture. After oxidation was complete, the reaction mixture was then poured into 800 grams of ice and 200 ml. concentrated hydrochloric acid. The ether layer was separated, washed with water and dried over magnesium sulfate. Further processing of the mixture showed that a predominant amount of the reaction product was a mixture of α-phenethyl alcohol and β-phenethyl alcohol. There were also present in the reaction mixture small amounts of addition compounds derived from the addition of the styrene to the original Grignard reagent, specifically phenylbutylcarbinols of the formulae

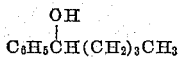

and

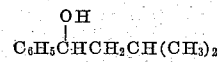

There was also present 1-phenylpentene-1 of the formula $C_6H_5CH=CH(CH_2)_2CH_3$ and 1-phenyl-3-methylbutene-1 of the formula $C_6H_5CH=CH-CH(CH_3)_2$.

When the procedure in Example 19 was repeated in the same way except isobutyl bromide was substituted for n-propyl bromide, but otherwise the reaction with the magnesium and the subsequent reaction of the newly formed Grignard was carried out in the same fashion as in Example 19, a reaction mixture was obtained which contained 1-phenyl-4-methylpentanol-1 having the formula

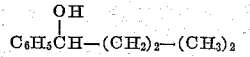

phenylneopentylcarbinol having the formula

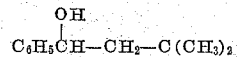

1-phenyl-4-methylpentene-1 having the formula $C_6H_5CH=CHCH_2CH(CH_3)_2$ and 1-phenyl-3,3-dimethylbutene-1 having the formula $C_6H_5CH=CHC(CH_3)_3$.

EXAMPLE 20

Employing the procedures of the previous examples, an ethylmagnesium bromide Grignard reagent was prepared from 0.5 mole of ethyl bromide and 0.55 mole of magnesium in 400 ml. of diethyl ether. To this Grignard reagent was added 0.5 mole 1-pentene at 0° C. followed by 1.45 ml. of titanium tetrachloride. The reaction mixture was heated with stirring at the reflux temperature of the mass for 18 hours, cooled to room temperature (about 25° C.) and then poured into 800 grams of ice and 200 ml. of concentrated hydrochloric acid. The ether layer was removed, the aqueous layer extracted with an additional 200 ml. of diethyl ether and the ether layers combined. The ether layer was then washed with water and dried over magnesium sulfate. Approximately 350 ml. of ether was removed by distillation and the remaining sample was then further processed to establish that in addition to the formation of pentane derived from the exchange reaction of the olefin and the Grignard, there were also present addition compounds, specifically 3-methylhexane and 2-ethylpentene-1.

EXAMPLE 21

The reaction of Example 20 was repeated except that titanium isopropoxide [$Ti(OC_3H_7)_4$] was substituted for the titanium tetrachloride. Also the proportion of titanium level (in the form of the titanium isopropoxide) was increased steadily while maintaining constant the level of magnesium in the form of the Grignard reagent. It was found that the yield of 3-methylhexane, namely, the addition product, increased with increasing amounts of the titanium isopropoxide. The following table shows the mol ratio of the titanium isopropoxide to the ethylmagnesium bromide, the weight ratio of titanium to magnesium, and the corresponding weight increase in the 3-methylhexane based on the weight of pentene employed.

Table I

| Mol Ratio of *$Ti(OC_3H_7)_4$ to $C_2H_5MgBr$ | Weight Ratio Ti/Mg | Weight Percent 3-Methylhexane Based on Weight Pentene Used |
|---|---|---|
| 0.38 | 0.76 | 28 |
| 0.50 | 1.00 | 36 |
| 0.64 | 1.28 | 44 |

* Titanium isopropoxide.

EXAMPLE 22

A 0.5 mole concentration n-propylmagnesium bromide Grignard reagent (in diethyl ether) was prepared similarly as was done in Example 19. The solution was cooled to −10° C. and 0.5 mole 1-octene added. About 0.5 mole titanium tetrachloride dissolved in 200 ml. of n-pentane was slowly added to the Grignard reagent. The reaction was then allowed to remain with stirring at a temperature of about 25° C. for about 18 hours after which it was hydrolyzed by pouring it into 800 grams of ice and 200 ml. of concentrated hydrochloric acid (37.2%). The ether layer was dried and the product was distilled to remove the diethyl ether. This yielded 14 grams of an undecane, specifically, 2,3-dimethylnonane, boiling point 184° C. and $n_D^{21}$ 1.4210 together with small amounts of 4-methyldecane, 2-propyloctene-1, and 2-isopropyloctene-1.

EXAMPLE 23

In this example, 1-hexene was reacted with an n-propyl magnesium bromide Grignard reagent similarly as in Examples 19 and 20 employing 0.5 mole concentration of the Grignard reagent and 0.5 mole concentration of the 1-hexene. The catalyst used in this example, however, was titanium isopropoxide. The titanium isopropoxide was varied in weight concentration with respect to the Grignard reagent in order to determine the effect of this variation. Each mixture of ingredients comprising the hexene, the propyl Grignard reagent and the titanium isopropoxide was heated for one hour at the reflux temperature of the mass (about 35° C.) at atmospheric pressure and thereafter the reaction product was hydrolyzed in the same fashion as was done in Example 20 employing ice and hydrochloric acid for the purpose. The reaction product was analyzed by vapor phase chromatography to determine the distribution of reaction products and unreacted hexene. In the following Table II, which shows the results of varying the catalyst concentration, the heading "Weight Ratio Ti/Mg" means the ratio of the weight of titanium metal (in the form of the titanium isopropoxide) to the weight of magnesium (in the form of the Grignard reagent). The other headings in the table, "Percent n-Hexane," "Percent Hexenes," and "Percent Nonanes" describe the percentages obtained of these particular identified materials, based on the weight of the n-hexene which was used initially in the reaction; the heading "Percent Hydrocarbons" is intended to cover the percent of hydrocarbon compositions present in the reaction mixture which have a carbon length greater than the nonanes.

Table II

| Wt. Ratio Ti/Mg | Percent n-Hexane | Percent [a] Hexenes | Percent [b] Nonanes | Percent Higher Hydrocarbons |
|---|---|---|---|---|
| 2 | 10.1 | 19.5 | 35.2 | 29.2 |
| 1 | 14.5 | 21.6 | 36.6 | 30.0 |
| 0.5 | 14.3 | 1.9 | 40.5 | 41.8 |
| 0.25 | 14.7 | 11.8 | 47.3 | 23.4 |
| 0.125 | 25.0 | 45.3 | 20.3 | 9.6 |
| 0.0625 | 29.2 | 49.0 | 17.0 | 6.2 |
| 0.0625 [c] | 53.2 | 11.4 | 18.4 | 6.9 |

[a] 1-hexene and 2-hexene.
[b] 85–90% 2,3-dimethylheptane.
[c] Refluxed for total of 13 hours.

It will be noted from the above Table II that as the weight ratio of titanium to magnesium decreases, the reaction is favored toward the formation of the hexanes, i.e., it favors the substitution (or exchange) reaction. In the higher concentration ranges for the titanium isopropoxide employing a weight ratio of titanium to magnesium of about 0.25 or higher, the reaction is favored toward addition of the propyl moiety of the Grignard reagent to the hexene.

EXAMPLE 24

In this example, the same conditions of reaction were repeated for the reaction of 1-hexene and the propyl magnesium Grignard reagent as in Example 23, with the exception that the catalyst used was titanium tetrachloride instead of titanium isopropoxide. The weight ratio of the titanium to the magnesium was varied as recited in Table III. Otherwise, the time of heating, the temperature, and the other conditions were the same as in Example 23. The headings and superscripts for the percentages of reaction products in Table III have the same meanings as the headings recited in Table II of Example 23.

Table III

| Wt. Ratio, Ti/Mg | Percent n-Hexane | Percent Hexenes | Percent Nonanes | Percent Higher Hydrocarbons |
|---|---|---|---|---|
| 1 | 9.2 | 50.6 | 17.6 | 14.5 |
| 2 | 9.6 | 51.7 | 13.8 | 2.0 |
| 0.085 | 25.0 | 73.0 | | |

When the reaction mixture described in the immediately above example and more specifically referred to in Table III using a weight ratio of 0.085 titanium to magnesium, was further heated for a total of 24 hours (instead of one hour) at the reflux temperature of the mixture, the percent yield of n-hexane, that is, the substitution product, rose to about 60 percent and the percent of 1-hexene dropped to about 5 percent.

For certain purposes, the titanium esters are preferred over the titanium halides, especially under those conditions where higher concentrations of titanium to magnesium will be used in the reaction. The reason for this is that there is a tendency for the titanium halide (or zirconium halide) to form a solid complex with diethyl ether, which is not the case with the titanium (or zirconium) esters, particularly the titanium isopropoxide. Therefore, in reactions employing higher weight ratios of titanium to magnesium, it is preferred that the titanium ester be used rather than titanium halide. However, this tendency toward complexing does not present a serious problem when using the titanium halide at lower concentrations such as below 0.5 weight ratio of titanium to magnesium, so that it is preferred, when the reaction is directed to the substitution phase of this invention to use the titanium halides in place of the titanium esters, particularly at the lower weight ratios of titanium to magnesium.

It will of course be apparent to those skilled in the art that in addition to the catalyst materials and olefinic compounds employed in the foregoing examples, other catalysts and olefinic compounds may be used, many examples of which are given above, without departing from the scope of the invention. Alternatively, the Grignard reagent with which the olefinic compounds react may also be varied widely and there is no restriction as to the type of usual Grignard reagents which may be used within the framework of the formula R'MgX.

The conditions of reaction may be altered to fit the occasion and the concentration of the catalyst may also be modified depending upon the conditions of the reaction and the desirability of obtaining either predominantly substitution or addition products. It will also be apparent that the proportion of the olefinic compound to the Grignard reagent can be varied widely. Generally, it is desirable that the olefinic compound and the Grignard reactant be present in essentially equimolar concentrations. An excess of one reactant (e.g., from a 1 to 10 molar excess) over the other is of course not precluded. Good results generally are obtained when there is present from about 0.5 to 2 moles of the olefinic compound for each mole of the starting Grignard reactant.

The Grignard reagents prepared in accordance with our process can be reacted with other reactants under conditions which usual Grignard reagents undergo, to form, for instance, alcohols, acids, esters, acetals, etc., which in turn can be used further to form other useful compounds. Thus, the acid can be reacted with alcohols some examples of which have been given above to form esters which are useful as plasticizers for various resins, particularly vinyl halide resins, such as polyvinyl chloride. Still other compounds obtainable as a result of practicing our process can be used for insect repellants or can be employed to make soaps, particularly those derived from long-chained olefinic compounds.

What we claim as new and desire to secure by Letters Patent of the United States is:

1. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, an olefinic hydrocarbon having the formula $$R-\overset{H}{\underset{|}{C}}=CH_2$$

with an alkyl Grignard reagent having the formula R'MgX in the presence of a catalyst selected from the class consisting of halides of titanium, halides of zirconium, alkoxides of titanium, aryloxides of titanium, alkoxides of zirconium, and aryloxides of zirconium, thereby producing a Grignard reagent having the $$R\overset{|}{C}HCH_2-$$

group present therein, where R is a monovalent organic radical free of substituents reactive with the alkyl Grignard reagent, R' is an alkyl radical of at least two carbon atoms having a hydrogen on the beta carbon atom, and X is a halogen, there being employed from about 0.2 to 2 moles of the olefinic hydrocarbon for each mole of the alkyl Grignard reagent, and the catalyst concentration being such that the metal in the catalyst is within the weight range of from about 0.0625 to 2 parts per part of magnesium in the Grignard reagent.

2. The process as in claim 1 in which the catalyst is present in an amount sufficient to produce predominantly a compound displaying the reaction of a composition having the formula RC$_2$H$_4$MgX where R and X have the meanings given in claim 1.

3. The process as in claim 1 in which the catalyst is present in an amount sufficient to produce predominantly an addition product of the olefinic hydrocarbon with the alkyl Grignard reagent having the formula $$RR'C_2H_3-MgX$$

where R, R' and X have the meanings given in claim 1.

4. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, styrene with an alkyl Grignard reagent having the formula R'MgX in the presence of a catalyst selected from the class consisting of halides of titanium, halides of zirconium, alkoxides of titanium, aryloxides of titanium, alkoxides of zirconium, and aryloxides of zirconium, where R' is an alkyl radical of at least two carbon atoms having a hydrogen on the beta carbon atom, and X is a halogen, thereby producing a Grignard reagent having the formula C$_6$H$_5$C$_2$H$_4$MgX, there being employed from about 0.2 to 2 moles of the styrene for each mole of the alkyl Grignard reagent, and the catalyst concentration being such that the metal in the catalyst is within the weight range of from about 0.0625 to 2 parts per part of magnesium in the Grignard reagent.

5. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, vinylcyclohexene with an alkyl Grignard reagent having the formula R'MgX in the presence of a catalyst of the class consisting of halides of titanium, halides of zirconium, alkoxides of titanium, aryloxides of titanium, alkoxides of zirconium, and aryloxides of zirconium, where R' is an alkyl radical of at least two carbon atoms having a hydrogen on the beta carbon atom, and X is a halogen, thereby producing a Grignard reagent having the formula

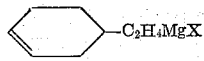

there being employed from about 0.2 to 2 moles of the vinylcyclohexene for each mole of the alkyl Grignard reagent, and the catalyst concentration being such that the metal in the catalyst is within the weight range of from about 0.0625 to 2 parts per part of magnesium in the Grignard reagent.

6. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, 1-pentene with an alkyl Grignard reagent having the formula R'MgX in the presence of a catalyst of the class consisting of halides of titanium, halides of zirconium, alkoxides of titanium, aryloxides of titanium, alkoxides of zirconium, and aryloxides of zirconium, where R' is an alkyl radical of at least two carbon atoms having a hydrogen on the beta carbon atom, and X is a halogen, thereby producing a Grignard reagent of the formula CH$_3$(CH$_2$)$_4$MgX, there being employed from about 0.2 to 2 moles of the 1-pentene for each mole of the alkyl Grignard reagent, and the catalyst concentration being such that the metal in the catalyst is within the weight range of from about 0.0625 to 2 parts per part of magnesium in the Grignard reagent.

7. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, vinylcyclohexane with an alkyl Grignard reagent having the formula R'MgX in the presence of a catalyst of the class consisting of halides of titanium, halides of zirconium, alkoxides of titanium, aryloxides of titanium, alkoxides of zirconium, and aryloxides of zirconium, where R' is an alkyl radical of at least two carbon atoms having a hydrogen on the beta carbon atom, and X is a halogen, thereby producing a Grignard reagent of the formula

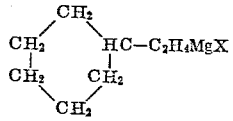

there being employed from about 0.2 to 2 moles of the vinylcyclohexane for each mole of the alkyl Grignard reagent, and the catalyst concentration being such that the metal in the catalyst is within the weight range of from about 0.0625 to 2 parts per part of magnesium in the Grignard reagent.

8. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, methoxystyrene with an alkyl Grignard reagent having the formula R'MgX in the presence of a catalyst selected from the class consisting of halides of titanium, halides of zirconium, alkoxides of titanium, aryloxides of titanium, alkoxides of zirconium, and aryloxides of zirconium, where R' is an alkyl radical of at least two carbon atoms having a hydrogen on the beta carbon atom, and X is a halogen, thereby producing a Grignard reagent of the formula

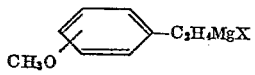

there being employed from about 0.2 to 2 moles of the methoxystyrene for each mole of the alkyl Grignard reagent, and the catalyst concentration being such that the metal in the catalyst is within the weight range of from about 0.0625 to 2 parts per part of magnesium in the Grignard reagent.

9. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, styrene with n-propylmagnesium bromide in the presence of catalytic amounts of titanium tetrachloride sufficient to produce phenylethyl magnesium bromide, there being employed from about 0.2 to 2 moles of the styrene for each mole of the n-propylmagnesium bromide and the concentration of the catalyst is such that the titanium in the catalyst is within the weight range of from about 0.0625 to 2 parts per part of magnesium in the n-propylmagnesium bromide.

10. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, vinylcyclohexane with n-propylmagnesium bromide in the presence of catalytic amounts of titanium tetrachloride sufficient to produce cyclohexylethyl magnesium bromide, there being employed from about 0.2 to 2 moles of the vinylcyclohexane for each mole of the n-propylmagnesium bromide and the concentration of the catalyst being such that the titanium in the catalyst is within the weight range of from about 0.0625 to 2 parts per part of magnesium in the n-propylmagnesium bromide.

11. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, 1-octene with n-propylmagnesium bromide in the presence of titanium tetrachloride sufficient to produce undecyl magnesium bromide, there being employed from about 0.2 to 2 moles of the 1-octene for each mole of the n-propylmagnesium bromide and the concentration of the titanium in the catalyst is within the weight range of from about 0.0625 to 2 parts per part of magnesium in the n-propylmagnesium bromide.

12. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, 1-pentene with n-propylmagnesium bromide in the presence of catalytic amounts of zirconium tetrachloride sufficient to produce pentyl magnesium bromide, there being employed from about 0.2 to 2 moles of the 1-pentene for each mole of the n-propylmagnesium bromide and the concentration of the catalyst being such that the zirconium in the catalyst is within the weight range of from about 0.0625 to 2 parts per part of magnesium in the n-propylmagnesium bromide.

13. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, 1-pentene with ethyl magnesium bromide in the presence of isopropyl titanate sufficient to produce heptyl magnesium bromide, there being employed from about 0.2 to 2 moles of the 1-pentene for each mole of the ethyl magnesium bromide and the concentration of the titanium in the catalyst is within the weight range of from about 0.0625 to 2 parts per part of magnesium in the ethyl magnesium bromide.

14. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, 1-pentene with n-propylmagnesium bromide in the presence of catalytic amounts of dicyclopentadienyl titanium dichloride sufficient to produce pentyl magnesium bromide, there being employed from about 0.2 to 2 moles of the 1-pentene for each mole of the n-propylmagnesium bromide and the concentration of the titanium in the catalyst is within the weight range of from about 0.0625 to 2 parts per part of magnesium in the n-propylmagnesium bromide.

15. The process which comprises reacting in a Grignard solvent medium selected from the class consisting of dialkyl ethers, cyclic oxygen-containing aliphatic compounds, alkyl aryl ethers, dialkyl ethers of an ethylene glycol, and pyridine, styrene with n-propylmagnesium bromide in the presence of titanium tetrachloride sufficient to produce predominantly a phenyl-substituted amyl magnesium bromide, there being employed from about 0.2 to 2 moles of the styrene for each mole of the n-propylmagnesium bromide and the concentration of the titanium in the catalyst is within the weight range of from about 0.0625 to 2 parts per part of magnesium in the n-propylmagnesium bromide.

References Cited by the Examiner

UNITED STATES PATENTS

| | | | |
|---|---|---|---|
| 1,963,935 | 6/34 | Carothers et al. | 260—665 |
| 2,795,627 | 6/57 | Ramsden | 260—665 |
| 2,938,932 | 5/60 | Normant | 260—665 |
| 3,070,549 | 12/62 | Ziegler et al. | 252—431 |
| 3,083,242 | 3/63 | Ramsden | 260—429 |

OTHER REFERENCES

Kharasch et al.: Grignard Reactions of Non-Metallic Substances (1954), pages 87–90.

TOBIAS E. LEVOW, *Primary Examiner.*